United States Patent
Yamamoto

(10) Patent No.: US 6,833,935 B2
(45) Date of Patent: Dec. 21, 2004

(54) IMAGE READING DEVICE

(75) Inventor: Yasuhiro Yamamoto, Tokyo (JP)

(73) Assignee: PENTAX Corporation, Tokyo (JP)

( * ) Notice: Subject to any disclaimer, the term of this patent is extended or adjusted under 35 U.S.C. 154(b) by 822 days.

(21) Appl. No.: 09/769,469

(22) Filed: Jan. 26, 2001

(65) Prior Publication Data

US 2002/0054375 A1 May 9, 2002

(30) Foreign Application Priority Data

Jan. 28, 2000 (JP) ........................................ P2000-019474

(51) Int. Cl.⁷ ................................................ H04N 1/32
(52) U.S. Cl. ........................ 358/468; 358/505; 358/401; 358/474; 382/312
(58) Field of Search ................................ 358/468, 442, 358/448, 462, 471, 474, 497, 505, 506; D14/420, 421; 382/312, 317, 325; 345/169, 905

(56) References Cited

U.S. PATENT DOCUMENTS

| | | | | |
|---|---|---|---|---|
| 4,571,053 A | * | 2/1986 | Kasama et al. | 399/48 |
| D285,564 S | * | 9/1986 | Bevilacqua et al. | D14/106 |
| 4,893,196 A | * | 1/1990 | Koshiyouji et al. | 358/474 |
| 5,550,938 A | * | 8/1996 | Hayakawa et al. | 382/313 |
| 5,555,105 A | * | 9/1996 | Shahir et al. | 358/473 |
| 6,078,407 A | * | 6/2000 | Ma | 358/474 |
| 6,185,010 B1 | * | 2/2001 | Watanabe | 358/474 |
| 6,275,309 B1 | * | 8/2001 | Hu et al. | 358/473 |
| 6,331,903 B1 | * | 12/2001 | Nakazawa et al. | 358/487 |
| 6,608,707 B1 | * | 8/2003 | Han | 358/497 |
| 6,710,895 B1 | * | 3/2004 | Gatto et al. | 358/1.6 |
| 2002/0003524 A1 | * | 1/2002 | Weng | 345/102 |

OTHER PUBLICATIONS

U.S. Appl. No. 09/200,853, filed on Nov. 30, 1998.
U.S. Appl. No. 09/299,095, filed on Apr. 26, 1999.
U.S. Appl. No. 09/480,460, filed on Jan. 11, 2000.

* cited by examiner

Primary Examiner—Kimberly Williams
Assistant Examiner—Tia Carter
(74) Attorney, Agent, or Firm—Greenblum & Bernstein, P.L.C.

(57) ABSTRACT

An image reading device comprises a mode select switch for changing the operation mode of the device between a remote mode and a stand-alone mode. The mode select switch is depressed by a liquid crystal display pivotally attached to a body of the image reading device. When the liquid crystal display is folded to depress the mode select switch, the remote mode is set, so that a back-light of the liquid crystal display is switched off. When the liquid crystal display is unfolded to release the mode select switch, the stand-alone mode is set, so that the back-light and the liquid crystal display are turned ON.

5 Claims, 6 Drawing Sheets

IMAGE READING DEVICE

BACKGROUND OF THE INVENTION

1. Field of the Invention

The present invention relates to an image reading device which reads an image recorded in a film, for example, using an optical sensor, and more particularly, relates to an improvement for reducing electric power consumption of the image reading device.

2. Description of the Related Art

Conventionally, there is known an image reading system which has an image reading device, in which an image recorded in a film is read by a line sensor, and a computer, which is connected to the image reading device to indicate the image on a screen of a display unit connected to the computer. In the image reading system, prior to a regular scanning operation which is an image reading operation for recording the image data in a recording medium, a pre-scanning operation is performed in which the image is read with a coarser pitch than the regular scanning operation. A pre-view image obtained by the pre-scanning operation is indicated on a screen of the display unit of the computer, so that the user of the image reading system can watch the pre-view image and adjust various parameters, to obtain the desired image quality.

It is also known that there is an image reading device which can operate without a computer, i.e. in a stand-alone mode, to record image data in a recording medium. In such a device, if a liquid crystal display is provided to indicate a pre-view image, a problem would occur in which electric power consumption is large because of the liquid crystal display.

SUMMARY OF THE INVENTION

Therefore, an object of the present invention is to provide an image reading device which can operate both in the remote mode and the stand-alone mode without consuming a large amount of electric power.

According to the present invention, there is provided an image reading device for reading an image recorded in a recording medium, using an optical sensor, the device being connected to a computer having a display unit, the device comprising a transmitting processor, a liquid crystal display and a control processor.

The transmitting processor transmits an image signal corresponding to the image to the computer in a remote mode, so that the image is indicated by the display unit. The liquid crystal display indicates the image in a stand-alone mode, in which the device is operated independently from the computer. The liquid crystal display has a back-light. The control processor, in the remote mode, turns OFF the back-light of the liquid crystal display, and in the stand-alone mode, turns ON the liquid crystal display and the back-light.

Further, according to the present invention, there is provided an image reading device which is operated in a remote mode, in which a computer is connected to the device and an image read by the device is indicated by a display unit of the computer, and in a stand-alone mode, in which the device is operated independently from the computer and the image is indicated by a liquid crystal display connected to the device, characterized in that, in the remote mode, a back-light of the liquid crystal display is turned OFF, and in the stand-alone mode, the liquid crystal display and the back-light are turned ON.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
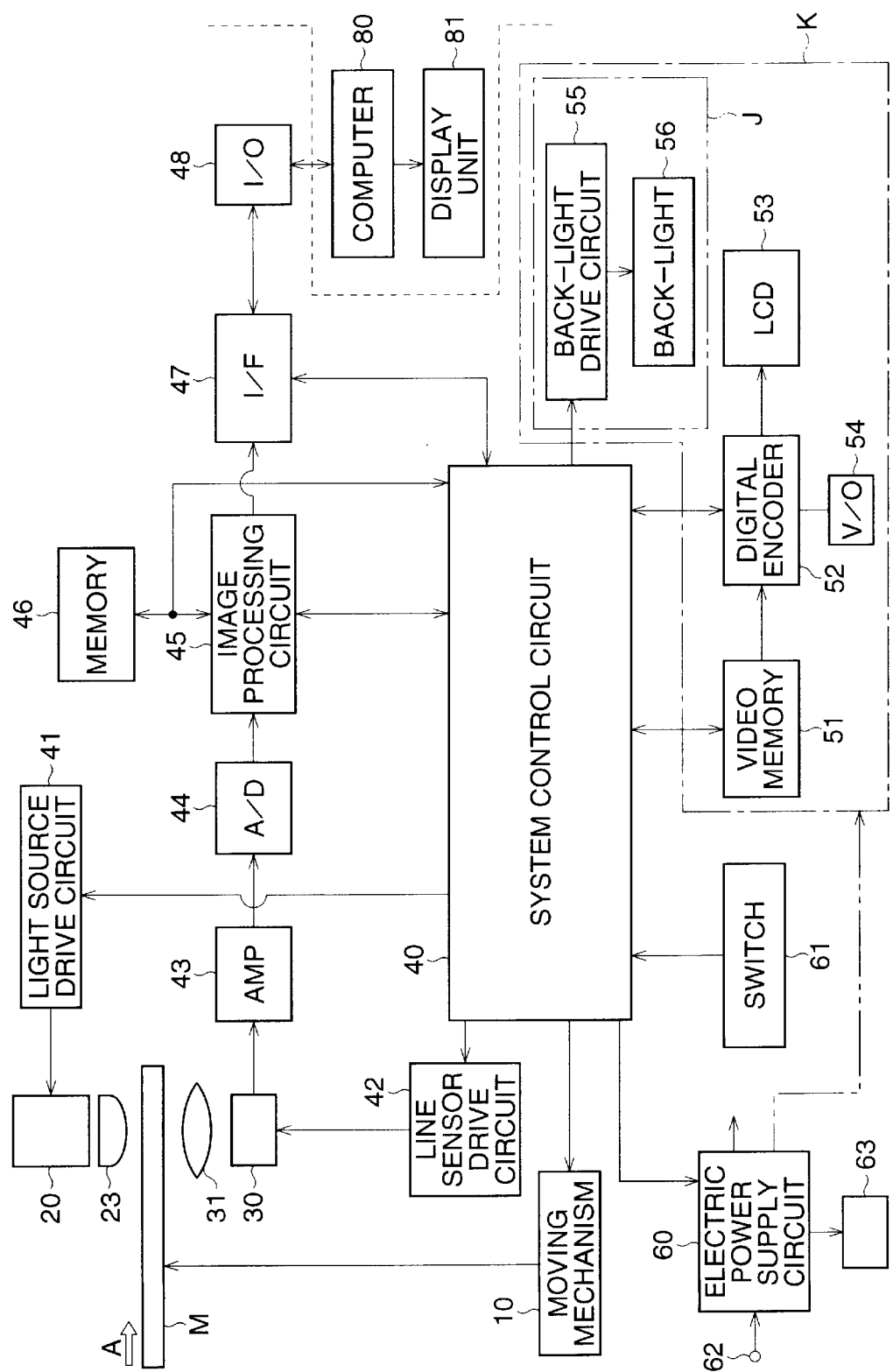
FIG. 1 is a block diagram showing an image reading device of a first embodiment of the present invention.

The present invention will be described below with reference to the embodiments shown in the drawings.

FIG. 1 shows an electrical structure of an image reading device of a first embodiment of the present invention.

A read object M, handled by this image reading device, is a transparent negative or positive film on which a color image has been recorded. The film M is intermittently moved, by a moving mechanism 10, in a direction shown by an arrow A.

A light source 20 and a cylindrical lens 23, provided below the light source 20, are disposed above a path along which the film M is moved. A line sensor 30 and a forming lens 31, provided above the line sensor 30, are disposed under the path. The light source 20 is connected to a light source drive circuit 41, so that the light source 20 can be turned ON and OFF. The line sensor 30 is connected to a line sensor drive circuit 42, so that the color image can be read by the line sensor 30. The moving mechanism 10, the light source drive circuit 41 and the line sensor drive circuit 42 are controlled in accordance with a command signal output by a system control circuit 40.

The line sensor 30 is provided with a plurality of photo-diodes, which are aligned rectilinearly, whereby an electric signal, corresponding to the amount of light received by the photo-diode, is generated in each of the photo-diodes. The electric signal (i.e., the image signal), read through the line sensor 30, is amplified by an amplifier 43 and is converted to a digital signal by an A/D converter 44. The digital image data are subjected to an image process, such as a shading correction, in an image processing circuit 45, and are then stored in a memory 46.

The digital image data, subsequent to being read from the memory 46, are subjected to various correction processes, such as a color correction and a gamma correction. Then, the corrected digital image data are converted to a signal, which conforms to a predetermined format, by an interface circuit 47, and can be output through an input/output terminal 48 to an external computer 80, which is connected to the image reading device. Thus, a color image is indicated on a screen of a display unit 81 connected to the computer 80. The image processing device 45 and the interface circuit 47 are controlled by the system control circuit 40.

A video memory 51 and a digital encoder 52 are connected to the system control circuit 40, and a liquid crystal display 53 and a video output terminal 54 are connected to the digital encoder 52. The image data read from the memory 46 are stored in the video memory 51 in a form of digital R, G and B image data, for example. The image data are converted to analog R, G and B image data in the digital encoder 52, and output to the liquid crystal display 53. Further, in the digital encoder 52, a composite video signal is generated based on the image data read from the video memory 51, and output to an external video device (not shown) through the video output terminal 54.

A back-light drive circuit 55 is connected to the system control circuit 40, so that a back-light 56 of the liquid crystal display 53 is turned ON and OFF by the back-light drive circuit 55.

A switch 61 provided with a track ball 57, a click button 58 and a mode select switch 59 (see FIG. 2) and an electric power source circuit 60, are connected to the system control circuit 40. The electric power source circuit 60 supplies electric power, which is supplied through an electric power supply connector 62, to an electric circuit provided in the image reading device. An indicating lamp 63 is connected to the electric source circuit 60, and is lit when the electric power source is turned ON.

Figure 2:
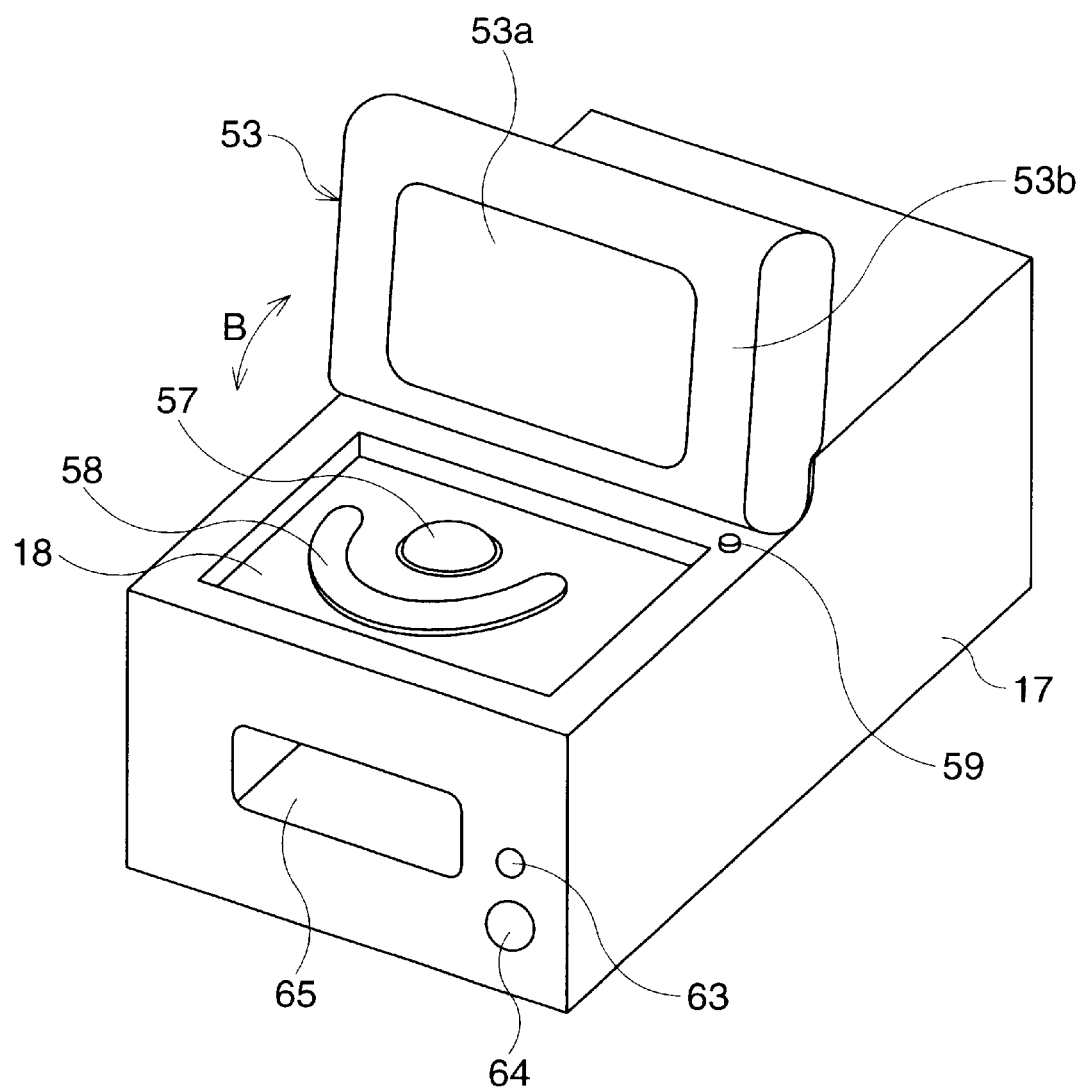
FIG. 2 is a perspective view of the image reading device, which is observed from a front side.

FIG. 2 is a perspective view of the image reading device observed from a front side.

The liquid crystal display 53 is pivotally attached to an upper surface of a body 17 of the image reading device, and is rotatable along an arrow B. The liquid crystal display 53 is rotated in a direction such that the screen 53a faces downward, to come into contact with the upper surface of the body 17, which is provided with a mode select switch 59. The mode select switch 59 is always urged upward by a spring (not shown). The liquid crystal display 53 is folded to the body 17 so that a frame 53b of the liquid crystal display 53 presses down the mode select switch 59 into the body 17, and the liquid crystal display 53 is unfolded from the body 17 so that the frame 53b releases the mode select switch 59 and the mode select switch 59 is projected from the upper surface of the body 17 by the spring force.

Thus, by operating the mode select switch 59 with the frame 53b, the image reading device is changed between a remote mode and a stand-alone mode. In the remote mode, an image read by the image reading device is indicated by the display unit 81 of the computer 80, and in the stand-alone mode, the image reading device is operated independently from the computer 80, and the image is indicated by the liquid crystal display 53.

A recess 18 is formed on the upper surface of the body 17. The track ball 57 and the click button 58 are provided in the recess 18, and are disposed in such a manner that the track ball 57 and the click button 58 do not interfere with the liquid crystal display 53 when the liquid crystal display 53 is folded to the body 17. The track ball 57 is used for moving a cursor indicated on the screen of the liquid crystal display 53. The click button 58 is used for performing an operation such as the selection of a button indicated on the screen.

An electric power source switch 64 and the indicating lamp 63 (see FIG. 1) are provided on a front surface of the body 17. Further, on the front surface, a film slot 65 is formed, through which the film M (see FIG. 1) is inserted into the body 17 to attach to a stage 12 (see FIG. 4) described later.

Figure 3:
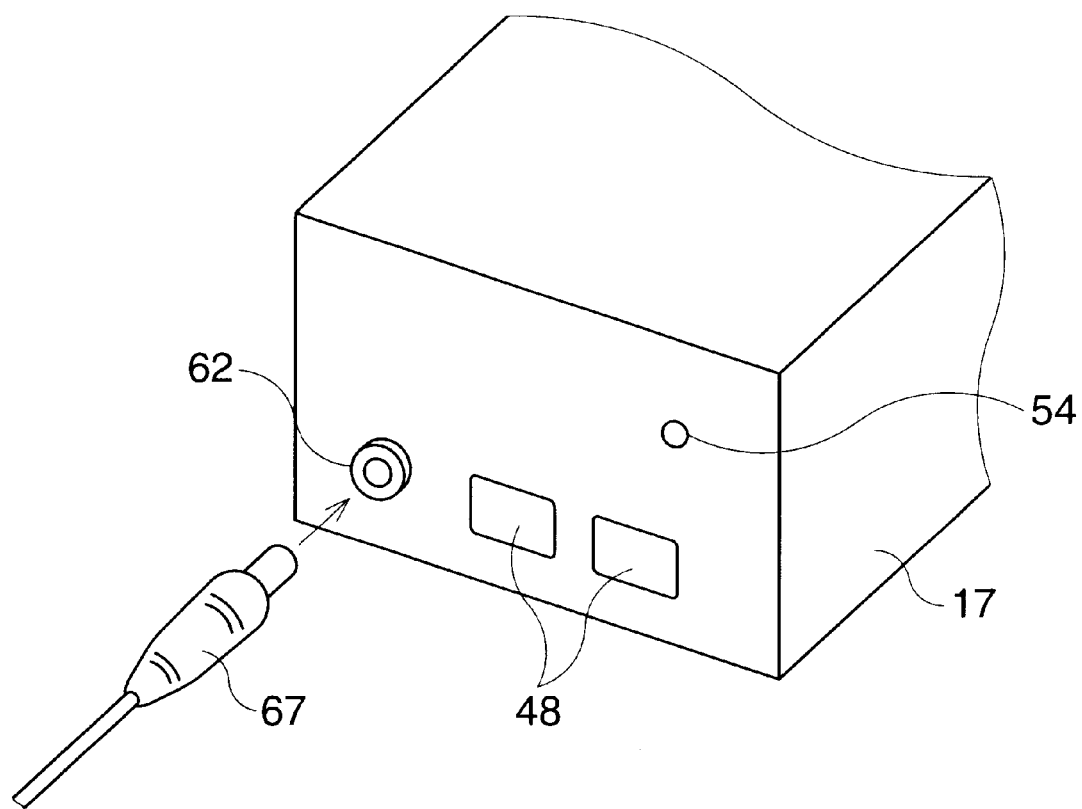
FIG. 3 is a perspective view of the image reading device, which is observed from a rear side.

FIG. 3 is a perspective view of the image reading device observed from a rear side.

The video output terminal 54 (see FIG. 1), the electric power supply connector 62 (see FIG. 1) and the input/output terminal 48 (see FIG. 1) are provided on a rear surface of the body 17. A video device is connected to the video output terminal 54 through a cable. An AC adaptor plug 67 is connected to the electric power supply connector 62, and the computer 80 is connected to the input/output terminal 48 through a cable.

Figure 4:
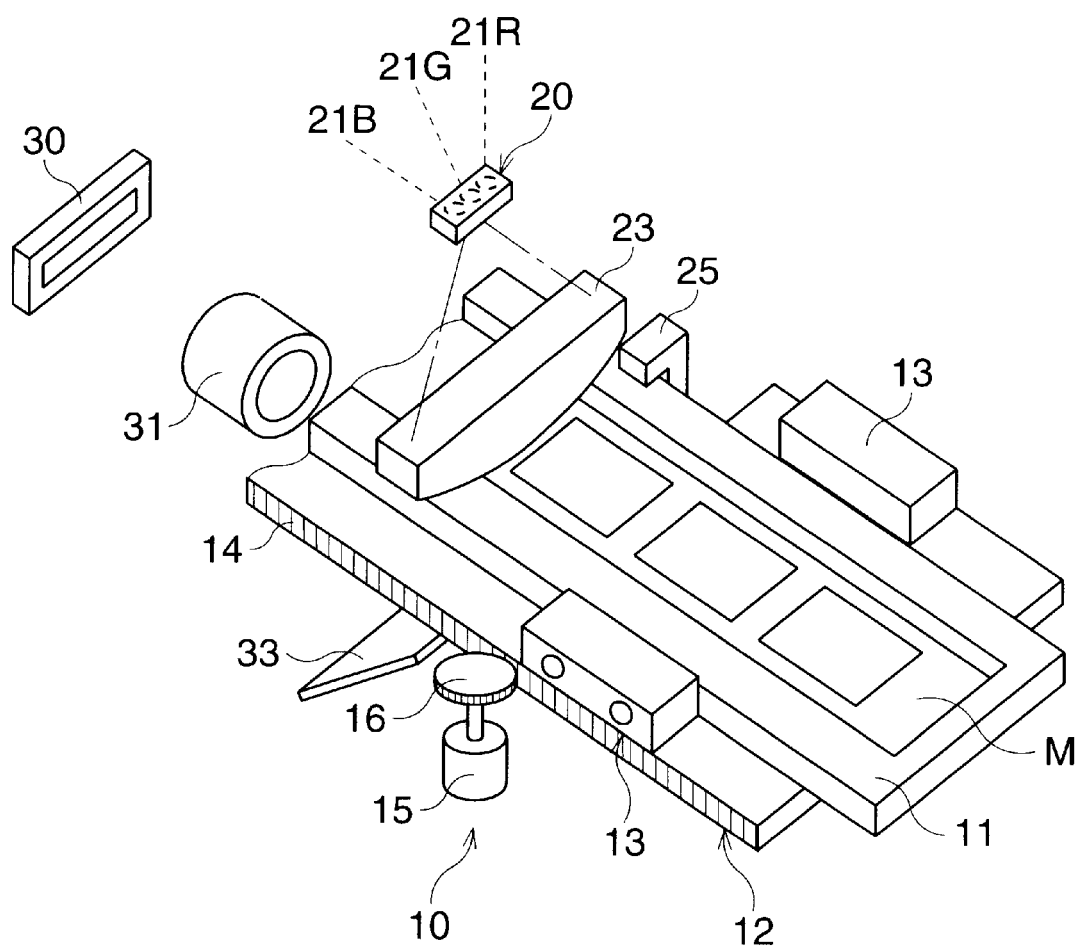
FIG. 4 is a perspective view showing a moving mechanism, a light source and a line sensor.

FIG. 4 shows the moving mechanism 10, the light source 20 and the line sensor 30. The negative film M is supported by a frame 11, which is fixed on a plate stage 12 by at least one fastener 13. A frame sensor 25 for sensing the frame 11 is provided close to the stage 12. An opening (not shown) is formed in the stage 12 at a position corresponding to the film M, so that a light beam radiated onto the film M can pass through the film M. A rack 14 is formed on a side surface of the stage 12. A pinion 16 fixed on an output shaft of a feeding motor 15 is meshed with the rack 14. The feeding motor 15, which is a stepping motor, for example, is driven under control of the system control circuit 40, so that the position of the film M is controlled. Thus, the moving mechanism 10 is formed by the rack 14, the feeding motor 15 and the pinion 16.

The light source 20, positioned above the stage 12, is provided with light-emitting diodes 21R, 21G and 21B, which radiate R (red), G (green) and B (blue) lightbeams, respectively. A cylindrical lens 23, positioned between the light source 20 and the stage 12, is extended in the breadth wise direction of the stage 12.

A mirror 33, which is omitted in FIG. 1, is disposed at a position below the stage 12 and corresponds to the light source 20. The mirror 33 is extended in the breadth wise direction of the stage 12, and in parallel with the cylindrical lens 23. The mirror 33 is inclined at approximately 45 degrees relative to the stage 12. A forming lens 31 is disposed under the stage 12 to face the mirror 33. The line sensor 30 is provided behind the forming lens 31, and is extended in parallel to the mirror 33.

When an image recorded in the film M is read, the light-emitting diodes 21R, 21G and 21B are turned ON in a predetermined order under control of the light source drive circuit 41, and thus, a light beam radiated from each of the light-emitting diodes is condensed by the cylindrical leans 23, so that a line-shaped light beam is radiated onto the film M. Thus, the image recorded in the film M is formed on a light receiving surface of the line sensor 30 through the forming lens 31.

Figure 5:
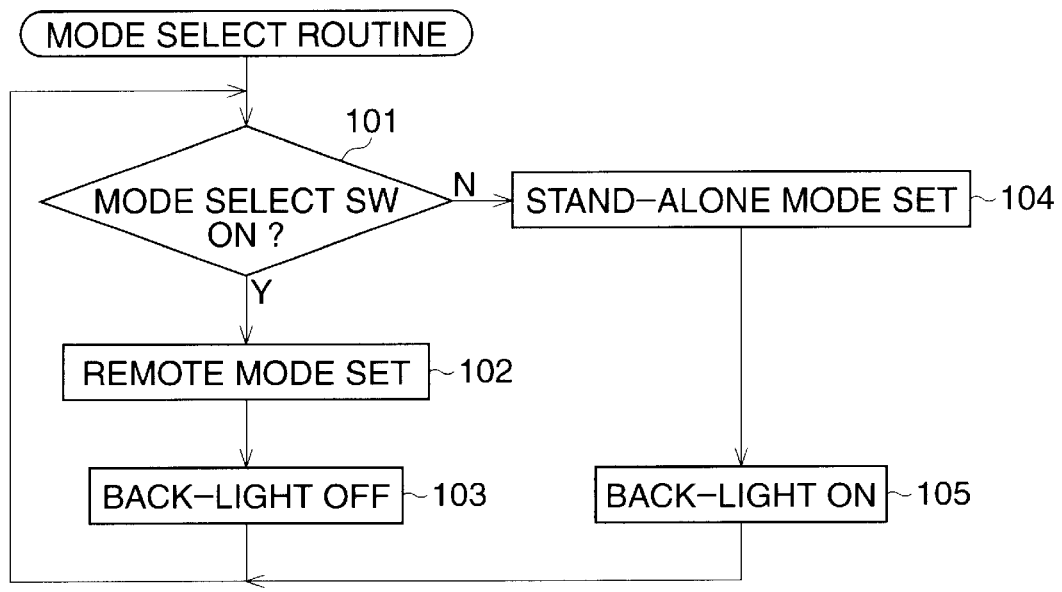
FIG. 5 is a flow chart of a program for changing the operation mode of the image reading device between a remote mode and a stand-alone mode, in the first embodiment.

FIG. 5 is a flow chart of a program which is executed in the system control circuit 40 to change the operation mode of the image reading device between the remote mode and the stand-alone mode. The program is executed in interrupt handling at predetermined time intervals, while the electric power source switch 64 is depressed to supply electric power to the image reading device.

In step 101, it is determined whether the mode select switch 59 is turned ON. When the mode select switch 59 is turned ON, i.e., when the liquid crystal display 53 is folded to depress the mode select switch 59, the process goes to Step 102, in which the remote mode is set, so that the operation of the image reading device is controlled by the computer 80. In Step 103, the back-light 56 of the liquid crystal display 53 is switched off, and the process goes back to Step 101.

Conversely, when it is determined in Step 101 that the mode select switch 59 is turned OFF, i.e., when the liquid crystal display 53 is unfolded to release the mode select switch 59, Step 104 is executed, so that the stand-alone mode is set. In the stand-alone mode, the image reading device is controlled independently from the computer 80. Namely, by using the track ball 57 and the click button 58 etc. to operate a button and the like indicated on the screen of the liquid crystal display 53, the operation of the image reading device is controlled. In Step 105, the liquid crystal display 53 and the back-light 56 are turned ON, and the process goes back to Step 101.

Since a reading operation of an image recorded in the film M and an operation such as a white balance adjustment are well known, a description thereof is omitted.

As described above, in the first embodiment, the remote mode is set when the liquid crystal display 53 is folded, and the back-light 56 of the liquid crystal display 53 is switched off. The circuits, which work for operations other than turning on the back-light 56, may remain actuated. Thus, in the remote mode, the supply of electric power to the circuits enclosed by a chain double-dashed line J in FIG. 1 is prevented, so that the electric power consumption is reduced by approximately 3W (=6V×500 mA), in comparison with a case in which the back-light 56 is kept on.

Figure 6:
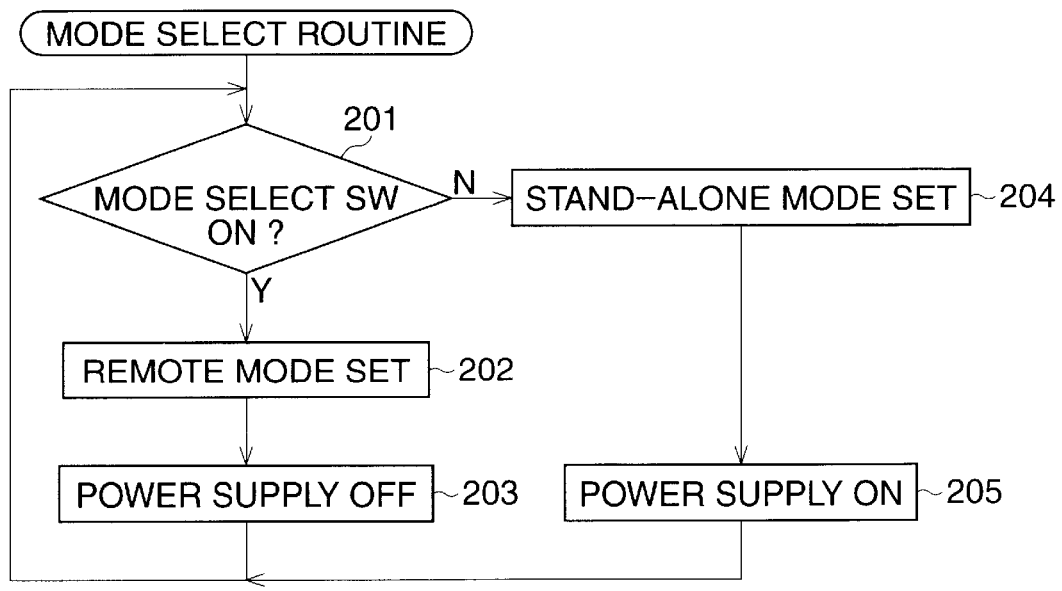
FIG. 6 is a flow chart of a program for changing the operation mode of the image reading device between the remote mode and the stand-alone mode, in a second embodiment.

FIG. 6 is a flow chart of a program which changes the operation mode of the image reading device between the remote mode and the stand-alone mode, in a second embodiment. The program is executed in interrupt handling at predetermined time intervals, while the electric power source switch 64 is depressed to supply electric power to the image reading device. Construction of the electric circuits and mechanical structures are identical with those of the first embodiment. Steps 201 through 205 of FIG. 6 correspond to Step 101 through 105 of FIG. 5, respectively.

In Step 203, the supply of electric power to the circuits which is not used to read the image in the remote mode, i.e., the circuits which are enclosed by a chain line K in FIG. 1 and are provided for indicating the image and outputting the image to an external device, is prevented. In Step 205, electric power is supplied to the above mentioned circuits. The other Steps 201, 202, 204 are identical with Steps 101, 102 and 104.

In the remote mode, on the second embodiment, the supply of electric power to not only the back-light 56 of the liquid crystal display 53, but also the circuits which is not used to read the image, is prevented. Therefore, the electric power consumption is further reduced over the first embodiment and the reduction is approximately 4W compared to a case where the supply of electric power to all the circuits is carried out.

Figure 7:
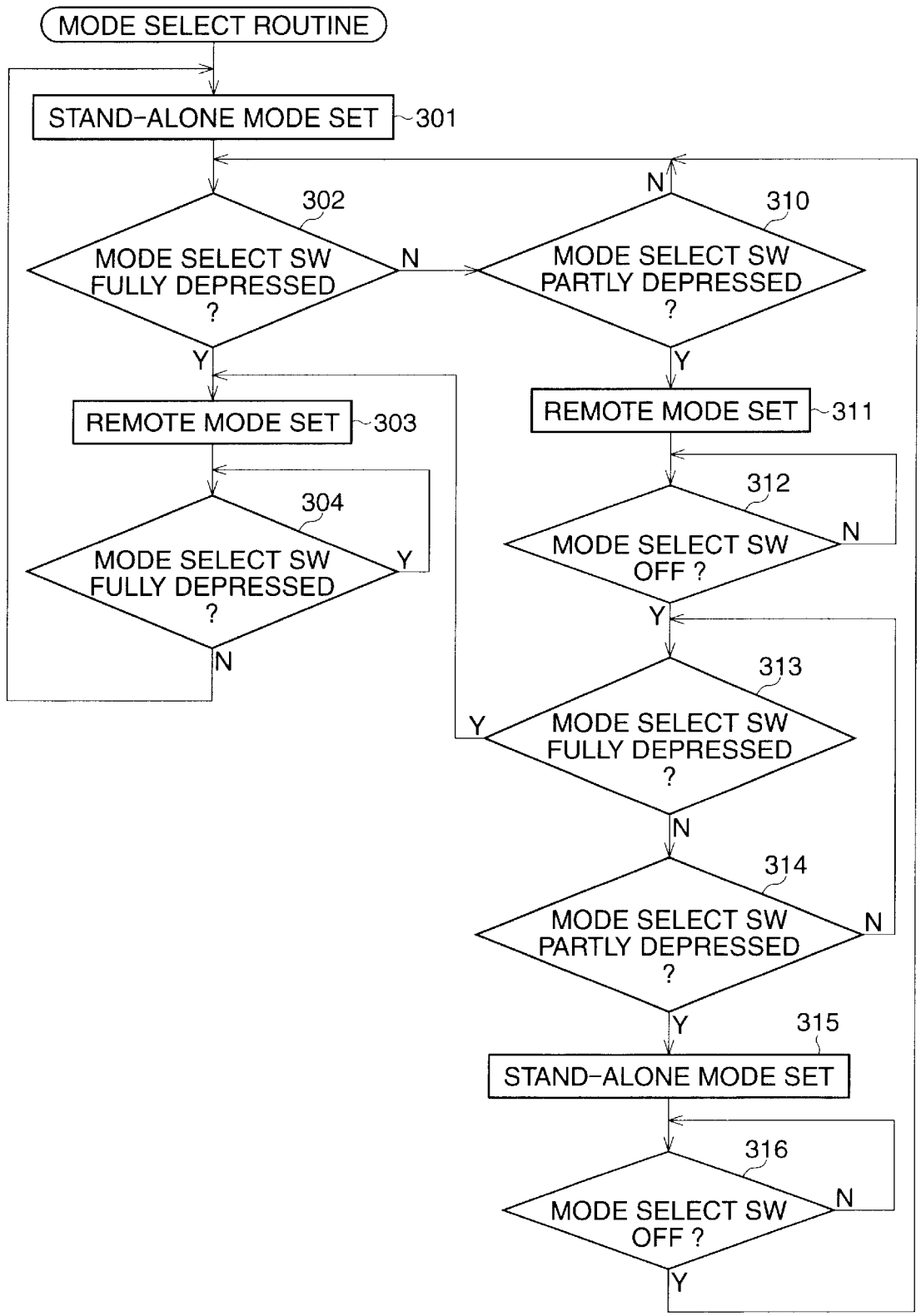
FIG. 7 is a flow chart of a program for changing the operation mode of the image reading device between the remote mode and the stand-alone mode, in a third embodiment.

FIG. 7 is a flow chart of a program which changes the operation mode of the image reading device between the remote mode and the stand-alone mode, in a third embodiment. The program is executed in interrupt handling at predetermined time intervals, while the electric power source switch 64 is depressed to supply electric power to the image reading device. The mode select switch 59 can be operated in two steps, which are a full depression and a part depression. The other constructions are identical with those of the first embodiment.

In Step 301, the stand-alone mode is set. In Step 302, it is determined whether the mode select switch 59 is being fully depressed. The mode select switch 59 is being fully depressed by folding the liquid crystal display 53 onto the body 17. When the mode select switch 59 is not being fully depressed, Step 310 is executed in which it is determined whether the mode select switch 59 is being partly depressed. The partly depressed condition is when the operator lightly pushes the mode select switch 59. When the mode select switch 59 is not being partly depressed, the process goes back to Step 302.

Therefore, when the liquid crystal display is raised or unfolded, and the operator is not handling the mode select switch 59, Steps 302 and 310 are repeatedly executed, so that the stand-alone mode is maintained.

When it is determined that the mode select switch 59 is being fully depressed, the process goes to Step 303, in which the remote mode is set. In Step 304, it is determined whether the mode select switch 59 is being fully depressed, Step 304 is repeatedly executed while the mode select switch 59 is being fully depressed. Conversely, when the mode select switch 59 is not being fully depressed, the process goes back to Step 301.

Accordingly, when the liquid crystal display 53 is folded, Step 304 is executed repeatedly, so that the remote mode is maintained. In this state, if the liquid crystal display 53 is unfolded to release the mode select switch 53, the process goes back to Step 301, in which the operation mode is changed to the stand-alone mode.

When it is determined in Step 310 that the mode select switch 59 is being partly depressed, Step 311 is executed, in which the remote mode is set. Then, in Step 312, it is determined whether the mode select switch 59 is released, i.e., turned OFF. While the mode select switch 59 is being partly depressed, Step 312 is repeatedly executed, and when the mode select switch 59 is released, the process goes to Step 313. In Step 313, it is determined whether the mode select switch 59 is being fully depressed. When the mode select switch 59 is being fully depressed, the process goes to Step 303, and when the mode select switch 59 is not being fully depressed, the process goes to Step 314. In Step 314, it is determined whether the mode select switch 59 is partly depressed. When the mode select switch 59 is not partly depressed, the process goes back to Step 313, and when the mode select switch 59 is partly depressed, the process goes back to Step 315.

Therefore, when the mode select switch 59 is partly depressed and then released, after Steps 310 through 314 are executed in order, Steps 313 and 314 are executed repeatedly, so that the remote mode is maintained. In this state, when the mode select switch 59 is fully depressed, i.e., when the liquid crystal display 53 is folded, the process goes from Step 313 to Step 303, so that the remote mode is maintained.

Conversely, when it is sensed in Step 314 that the mode select switch 59 is again partly depressed, Step 315 is executed in which the stand-alone mode is set. In Step 316, it is determined whether the mode select switch 59 is released. Step 316 is executed repeatedly while the mode select switch 59 is being partly depressed, and when the mode select switch 59 is released, the process goes back to Step 302.

Therefore, when the mode select switch 59 is partly depressed so that the stand-alone mode is set in Step 315, and the mode select switch 59 is then released, Steps 310 and 302 are executed repeatedly, so that the stand-alone mode is maintained. In this state, if the mode select switch 59 is partly depressed, the process goes from Step 310 to Step 311, in which the remote mode is set.

Thus, by partly depressing and then releasing the mode select switch 59, the operation mode is changed between the remote mode and the stand-alone mode.

As described above, in the third embodiment, in a similar way as the first embodiment, the supply of electric power to the back-light 56 of the liquid crystal display 53 is turned ON and OFF in association with the switching operation between the remote mode and the stand-alone mode, and the supply of electric power to the circuits which are not used to read the image may be turned ON and OFF in association with the switching operation, as in the second embodiment.

Thus, according to the third embodiment, a switching operation between the remote mode and the stand-alone mode is performed by the operator handling the mode select switch 59, and therefore, the consumed electric power is reduced, similar to the first and second embodiments.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2000-019474 (filed on Jan. 28, 2000) which is expressly incorporated herein, by reference, in its entirety.

What is claimed is:

1. An image reading device for reading an image recorded in a recording medium, using an optical sensor, said device being connected to a computer having a display unit, said device comprising:

a transmitting processor that transmits an image signal corresponding to said image to said computer in a remote mode, so that said image is indicated by said display unit;

a liquid crystal display that indicates said image in a stand-alone mode, in which said device is operated independently from said computer, said liquid crystal display having a back-light; and a control processor that, in said remote mode, turns OFF said back-light of said liquid crystal display, and in said stand-alone mode, turns ON said liquid crystal display and said back-light.

2. A device according to claim 1, wherein said control processor stops the supply of electric power to an electric circuit which is not used to read said image.

3. A device according to claim 1, wherein said liquid crystal display is pivotally attached to a body of said device, said body being provided with a mode select switch for selecting one of said remote mode and said stand-alone mode, said liquid crystal display being folded to said body so that said liquid crystal display presses down said mode select switch to set said remote mode, said liquid crystal display being unfolded from said body so that said liquid crystal display releases said mode select switch to set said stand-alone mode.

4. A device according to claim 3, wherein said liquid crystal display is folded to said body so that said mode select switch is fully depressed to set said remote mode, and said mode select switch is partly depressed and then released so that said mode select switch can be operated.

5. An image reading device which is operated in a remote mode, in which a computer is connected to said device and an image read by said device is indicated by a display unit of said computer, and in a stand-alone mode, in which said device is operated independent from said computer and said image is indicated by a liquid crystal display connected to said device, characterized in that, in said remote mode, a back-light of said liquid crystal display is turned OFF, and in said stand-alone mode, said liquid crystal display and said back-light are turned ON.

* * * * *